(12) United States Patent
Pleima

(10) Patent No.: US 9,963,293 B2
(45) Date of Patent: May 8, 2018

(54) PARTICULATE MATERIAL STORAGE AND DELIVERY SYSTEM

(75) Inventor: Gregory S. Pleima, Reasnor, IA (US)

(73) Assignee: Bridgrid, Inc., Pella, IA (US)

( * ) Notice: Subject to any disclaimer, the term of this patent is extended or adjusted under 35 U.S.C. 154(b) by 817 days.

(21) Appl. No.: 12/931,417

(22) Filed: Feb. 1, 2011

(65) Prior Publication Data

US 2012/0193357 A1   Aug. 2, 2012

(51) Int. Cl.
| | | |
|---|---|---|
| *B65D 51/00* | (2006.01) | |
| *B65D 88/66* | (2006.01) | |
| *A01F 25/20* | (2006.01) | |
| *B65D 88/26* | (2006.01) | |

(52) U.S. Cl.
CPC .......... *B65D 88/66* (2013.01); *A01F 25/2018* (2013.01); *B65D 88/26* (2013.01); *B65D 2590/0091* (2013.01)

(58) Field of Classification Search
CPC ...... B65D 88/66; B65D 88/26; A01F 25/2018
USPC ......... 222/161; 220/650–651, 653–654, 729, 220/694
See application file for complete search history.

(56) References Cited

U.S. PATENT DOCUMENTS

| | | | | |
|---|---|---|---|---|
| 1,942,581 A | * | 1/1934 | Tolman, Jr. ............ | B65D 88/66 105/247 |
| 2,254,448 A | * | 9/1941 | Pursel ...................... | B06B 3/00 222/196 |
| 3,261,508 A | * | 7/1966 | Wahl ...................... | B65D 88/66 222/161 |
| 3,773,231 A | * | 11/1973 | Wahl ............................. | 222/198 |
| 4,062,527 A | * | 12/1977 | Schmitz ...................... | 366/114 |
| 5,516,009 A | * | 5/1996 | Kautz ....................... | B01F 7/04 222/238 |
| 5,651,479 A | * | 7/1997 | Bates ........................... | 222/196 |
| 5,906,293 A | * | 5/1999 | Geiser et al. ..................... | 222/1 |
| 6,447,631 B1 | * | 9/2002 | Schahl ...................... | C09J 5/04 156/295 |
| 6,715,243 B1 | * | 4/2004 | Fons .............................. | 52/192 |
| 2007/0071590 A1 | * | 3/2007 | Podd .................... | B65D 88/128 414/809 |
| 2010/0070073 A1 | * | 3/2010 | Foley et al. .................. | 700/240 |

FOREIGN PATENT DOCUMENTS

| | | | | |
|---|---|---|---|---|
| DE | 1279546 B | * | 10/1968 | ............. B65D 88/66 |
| JP | 2003175993 A | * | 6/2003 | |

OTHER PUBLICATIONS

Brock CTB (Commercial Hopper Tank Features) published Feb. 2010.*

* cited by examiner

*Primary Examiner* — Yogendra N Gupta
*Assistant Examiner* — Ninh Van Le
(74) *Attorney, Agent, or Firm* — McKee, Voorhees & Sease, PLC

(57) ABSTRACT

A bulk storage and delivery system for agricultural feed. Curved plates are secured to the interior and exterior of a bulk feed storage container. The curved plates are secured to one another and a vibrator is secured to the curved plates. Horizontal and vertical vibration bars are secured to the curved plates on the interior of the bulk feed storage container. The vibrator transmits vibration through the curved plates and into the horizontal and vertical vibration bars to facilitate flow and reduce bridging and rat holing of the material provided within the bulk feed storage container.

11 Claims, 6 Drawing Sheets

PARTICULATE MATERIAL STORAGE AND DELIVERY SYSTEM

TECHNICAL FIELD

The present disclosure relates in general to the storage and delivery of particulate material and, more particularly, to the storage and delivery of agricultural feed material.

BACKGROUND

Agricultural bulk feed bins are well known. The bins are designed to gravity feed agricultural feed from an upper storage area to a lower outlet. The feed may include various materials of various moisture contents and consistencies. In addition to grains, the feed may contain medications, waste foods, such as cold cereal, doughnuts, cakes, breads, pastries etc. and dried distillers grains to decrease the overall cost, while modifying weight gaining attributes of the feed.

One drawback associated with the prior art practice of adding waste foods to agricultural feed is the irregular consistency and increased moisture associated with such additives, which can create flowability problems, especially within bulk feed bins. Even if only regularly shaped grain is used, fine grind, high moisture content, high ambient humidity, poor storage conditions and mold can also cause problems in consistently delivering feed material from bulk feed bins.

Fine, irregularly shaped, moist, poorly stored, old and moldy feed materials may form an "arch" or a "bridge" within the bulk feed bin, thereby preventing the feed material from exiting the bulk feed bin through the outlet. Additionally, the feed material may "rat hole," a condition in which the feed material flows only along one or more tunnels formed in the bulk feed material. Rat holing can lead to irregularity in the density of material being delivered, a failure to deliver older feed material before newer material and an eventual no-flow condition, such as that encountered with bridging.

One way to address the problems of bridging and rat holing is to manually strike the bin with a rubber mallet. While this technique is effective, it requires the operator to be near the bin and identify the bridging or rat holing problem as soon as it occurs. It is also known in the art to attach a vibrator to the bulk feed bin. Such vibrators are typically pneumatically driven to dislodge stuck feed, and reduce bridging and rat holing. A vibrator, typically pneumatic, may be attached to a pole supporting the bulk feed bin. The vibration from the vibrator travels up the pole and into the bulk feed bin, thereby dislodging stuck feed. One drawback associated with such prior art systems is the difficulty in transmitting sufficient vibration from the support pole to the feed inside the bin.

It is also known in the art to equip bulk feed bins with circular vibrating dischargers integrated into the outlet. While such integrated systems are functional, they are expensive, must be custom designed for and integrated with the bulk feed bin, require increased maintenance and are difficult to retrofit onto irregular, worn or unusually shaped bulk feed bins.

Agitators positioned within the bulk feed bin are also known. Devices such as the Feedfas bin agitator or Sure Flo Agitator Assembly are cone-shaped devices positioned over the outlet, which rotate as feed flows out of the feed bin to keep grain from bridging. One drawback associated with such devices is the tendency of the feed to bridge or create cavities around the rotating cone-shaped agitator. Other devices, such as the JitterBall feed bin agitator, are also known. Such devices have a large ball secured to an arm. As feed flows past the ball, the ball moves, causing the attached arm to agitate the feed. While such devices may aid the flow of feed through the bin, as the feed creates cavities and bridges around these devices, their utility decreases accordingly.

It would, therefore, be desirable to provide a low-cost, low maintenance bulk feed bin vibration system, which reduced rat holing and bridging, and which may be retrofit onto existing bulk feed bins. The difficulties encountered in the prior art heretofore are substantially eliminated by the present disclosure.

SUMMARY OF THE DISCLOSED SUBJECT MATTER

The disclosed subject matter relates to a feed bin having a container and a vibrator. The container has a sidewall and a tapered floor defining an interior. The vibrator is provided outside the container and is coupled by a plurality of fasteners to a plate located on the interior of the container. A crossbar is provided on the interior and is coupled between the plate and the tapered floor of the container.

BRIEF DESCRIPTION OF THE DRAWINGS

The present invention will now be described, by way of example, with reference to the accompanying drawings in which.

DETAILED DESCRIPTION OF THE DRAWINGS

Figure 1:
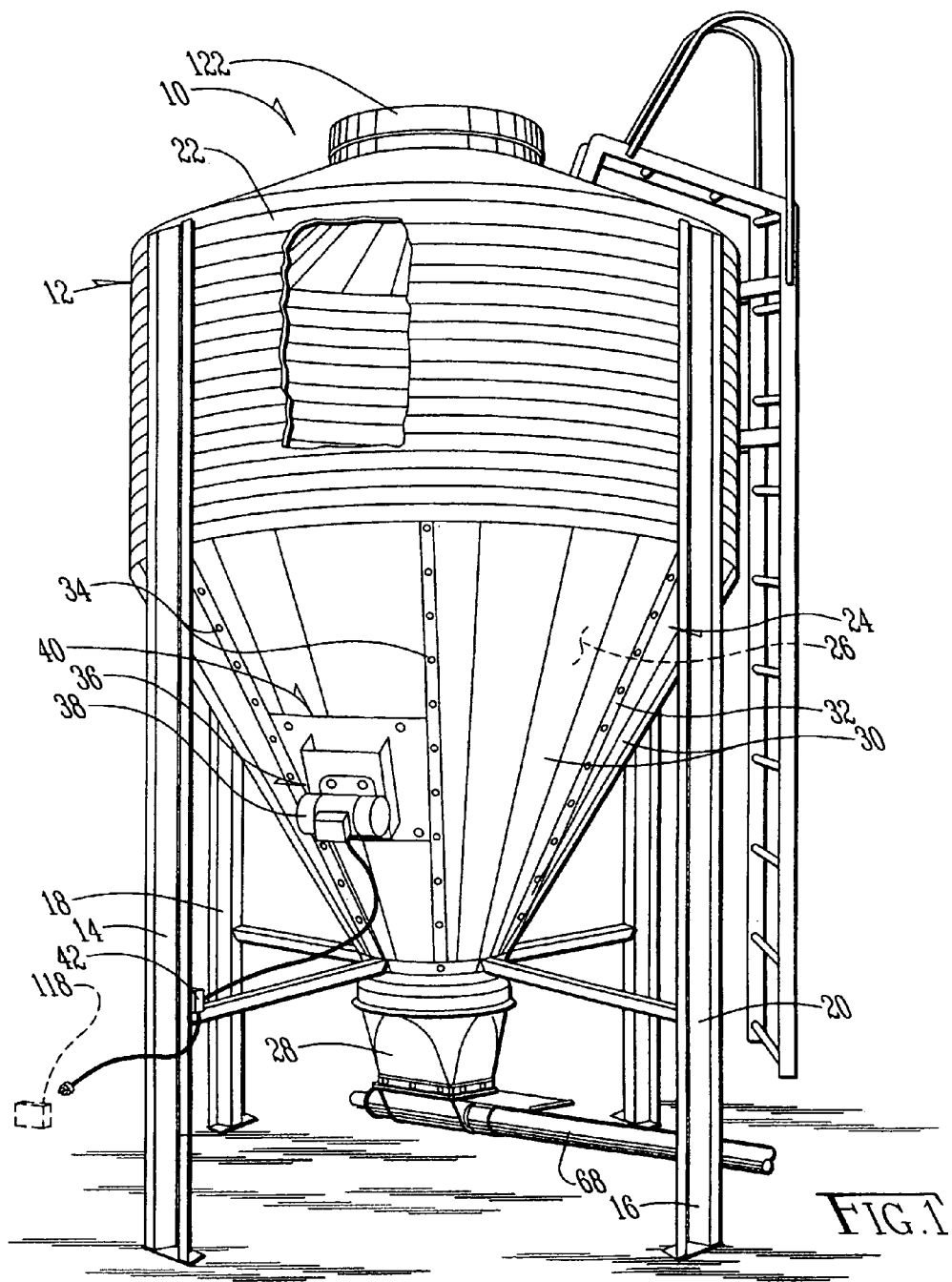
FIG. 1 illustrates a side perspective view in partial cross-section of a system embodying the subject matter of the disclosure.

The present subject matter relating to a system and method for storing and delivering agricultural feed material is shown generally as (10) in FIG. 1. The system includes a container (12), supported by four support poles (14), (16), (18) and (20). The container (12) is Model No. 45-00603 bulk feed container manufactured by CTB, Inc. of Milford, Ind., but may be any type of bulk feed container known in the art. The container is preferably provided with a sidewall (22) and tapered floor (24) defining an interior (26), and a capacity of between 1.0 and 200 cubic meters, more preferably between 5.0 and 50 cubic meters, and most preferably around 8.7 cubic meters. The tapered floor (24) is tapered sixty degrees from horizontal and is coupled to a hollow frustoconical outlet (28). The tapered floor (24) is constructed of nine curved and tapered floor panels (30) secured to one another along a plurality of steel ribs (32) by a plurality of fasteners (34), such as bolts or rivets.

Figure 2:
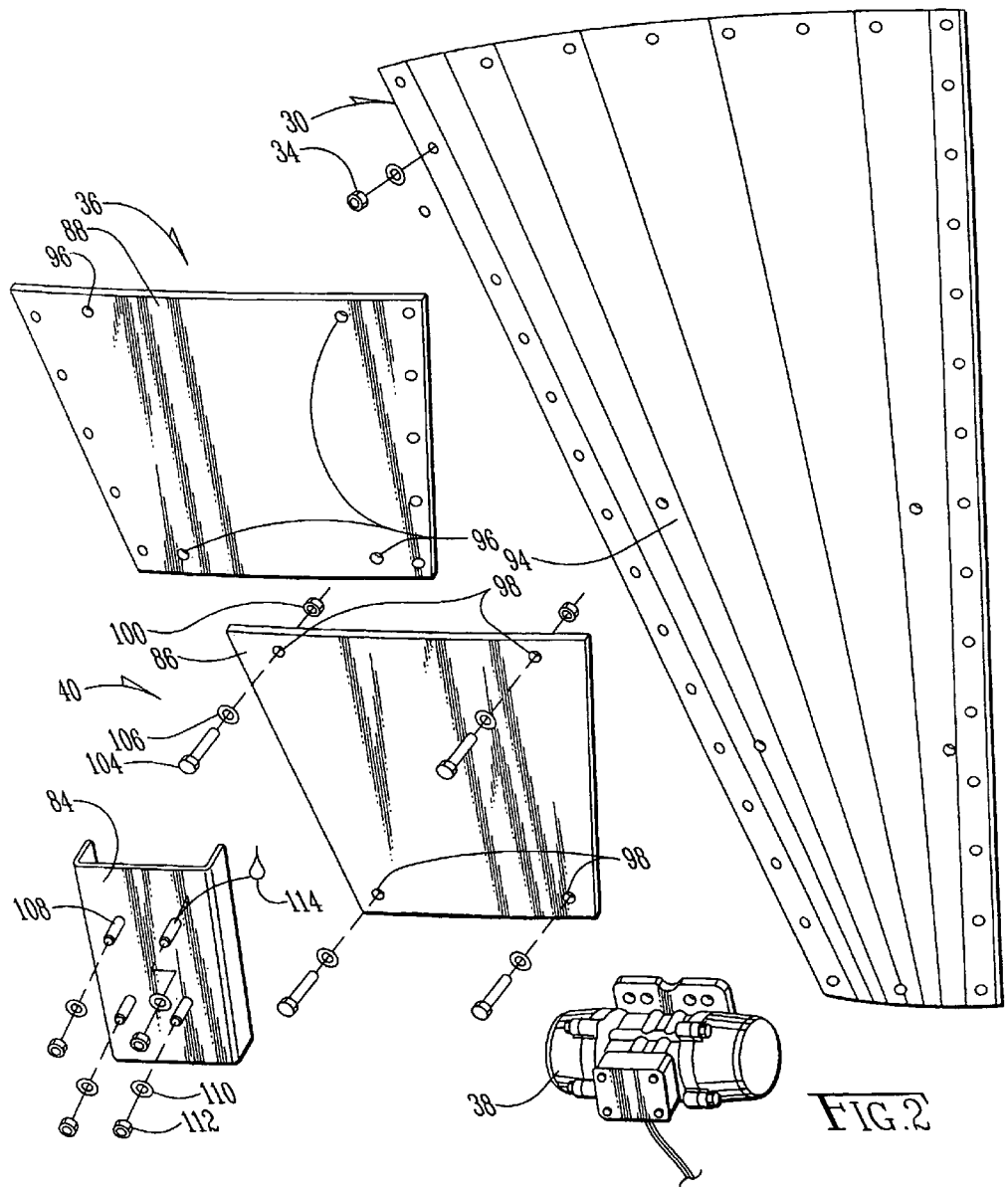
FIG. 2 illustrates top exploded perspective view of the vibrator assembly of FIG. 1.
Figure 3:
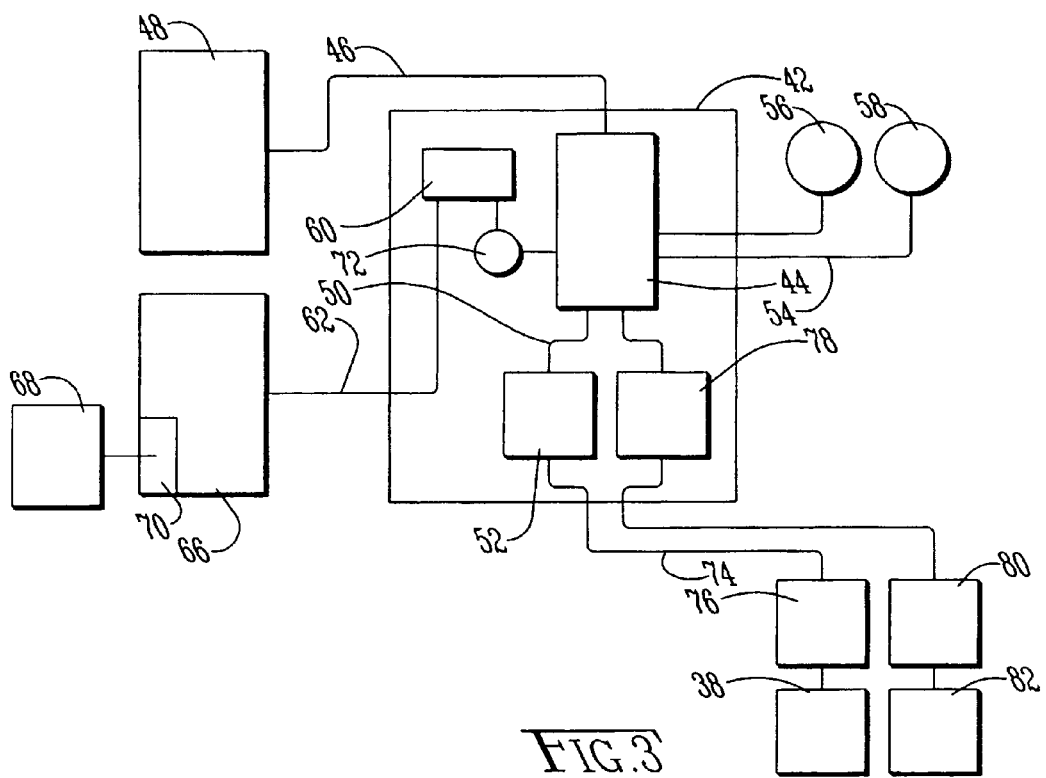
FIG. 3 illustrates a schematic of the vibrator assembly of FIG. 1.

As shown in FIGS. 2-3, a vibrator assembly (36) is provided with a vibrator (38) and a mounting assembly (40). The vibrator (38) is a three-phase, ⅓ horsepower, 3600 RPM electric vibrator, sold by Deca Products, Inc., and is provided with adjustable weights on each end. As shown in the schematic of FIG. 3, the vibrator (38) is operated from a control panel (42). Provided within the control panel (42) is a Square D ATV312H075M2 one horsepower 240 volt single phase to triple phase drive (44). The drive (44) is powered by two 120-volt lines (46) coupled to a standard breaker panel (48), such as those known in the art. The drive (44) is coupled via two sets of three 120-volt lines (50) to two Square D LRD06 overload relays (52). The drive (44) is coupled via three 24 VDC control wires (54) to a Galco KU5021S64 Potentiometer (56) and a Square D ZB4BD922 Potentiometer (58). The potentiometers (56) and (58) allow the speed of the vibrator (38) to be adjusted.

The drive (44) is coupled to, and drives, a Hawkeye H608 current switch (60) via two 24 VDC control wires (62). A 120-volt feeder control voltage line (64) is fed to the current switch (60), which causes the current switch (60) to activate the drive (44) when there is current flowing through the feeder control voltage line (64) and deactivate the drive (44) when there is no current flowing through the feeder control voltage line (64). The feeder control voltage line (64) is preferably coupled to feed line breaker panel (66) in a manner that sends current through the feeder control voltage line (64) when the auger (68) fed by the container (12) is running. The auger (68) is preferably coupled to a timer (70), to shut off the auger (68) after a predetermined time. The current switch (60) is designed to sense operation of the auger (68) and cause the drive (44) to actuate the vibrator (38) in response thereto. Preferably, a manually switchable override selector switch (72) is coupled to the current switch (60) to allow a user to cause the drive (44) to actuate the vibrator (38) regardless of whether the auger (68) is running. The selector switch (72) may be used to completely empty the container (12) for cleaning, or for any other desired purpose. The overload relay (52) is coupled via three 120-volt lines (74) to the vibrator (38) via an Altech KEM325ULYR disconnect (76) or similar electrical disconnect known in the art. Preferably, a second overload relay (78) is coupled from the drive (44) to a second disconnect (80) and a second vibrator (82) coupled to a second bin (not shown). Alternatively, any system known in the art for varying the speed of the vibrator (38) may be used.

Figure 4:
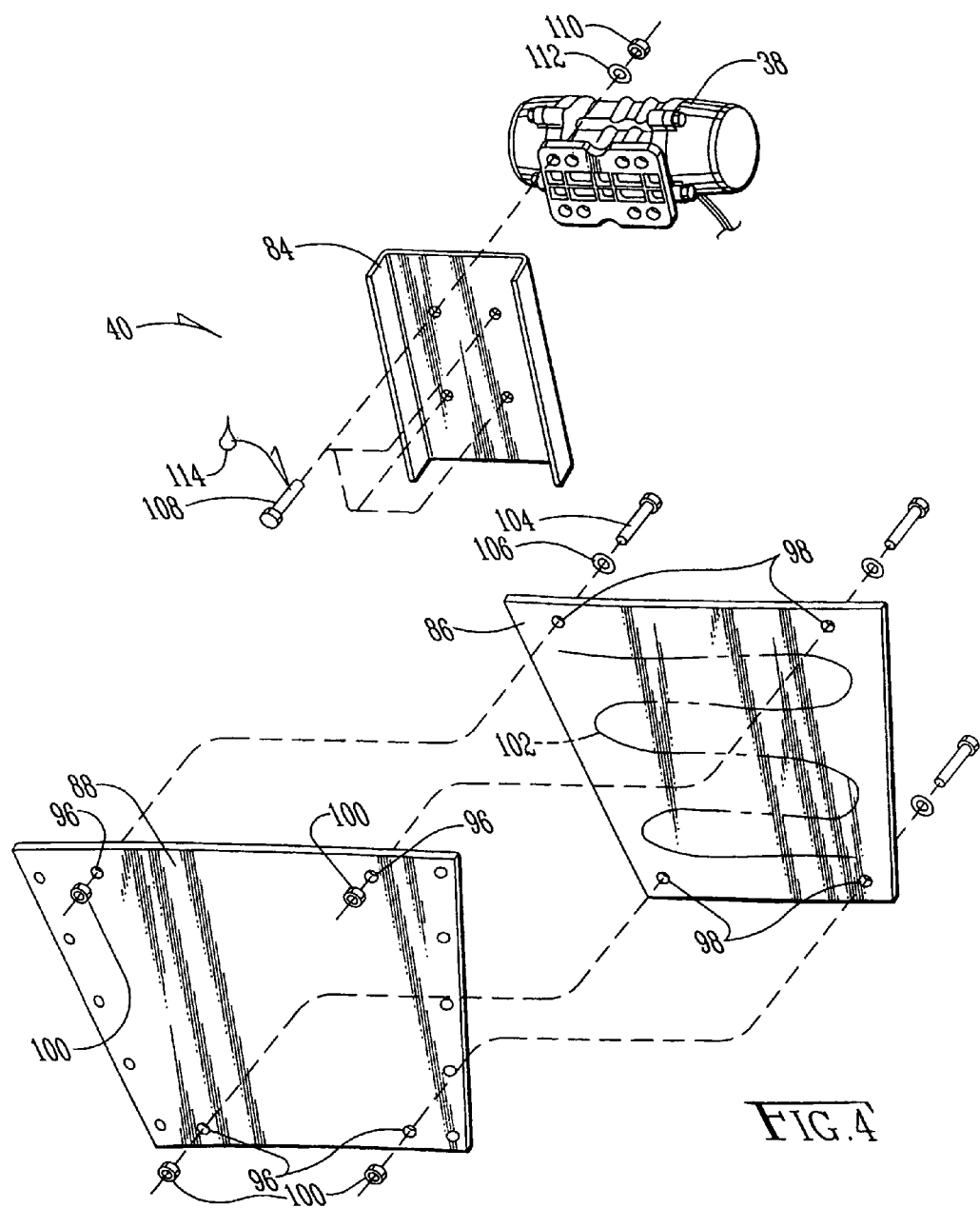
FIG. 4 illustrates a bottom exploded perspective view of the vibrator assembly of FIG. 1.

As shown in FIG. 4, the mounting assembly (40) includes a vibrator mount (84) constructed of seven gauge steel, welded to an exterior plate (86) and a separate interior plate (88) constructed of twelve gauge steel. The exterior plate (86) and interior plate (88) are provided with about the same curve and taper as the tapered floor panels (30). The interior plate (88) is approximately sixty-one centimeters by forty-eight centimeters across its center point. The exterior plate (86) is approximately forty-six centimeters by forty-one centimeters across its center point. The vibrator mount (84) is thirty centimeters by twenty-three centimeters and four centimeters high. Four bolts (108), preferably at least one centimeter in diameter and five centimeters long, are provided through holes in the vibrator mount (62) and welded thereto. (FIG. 2).

Figure 5:
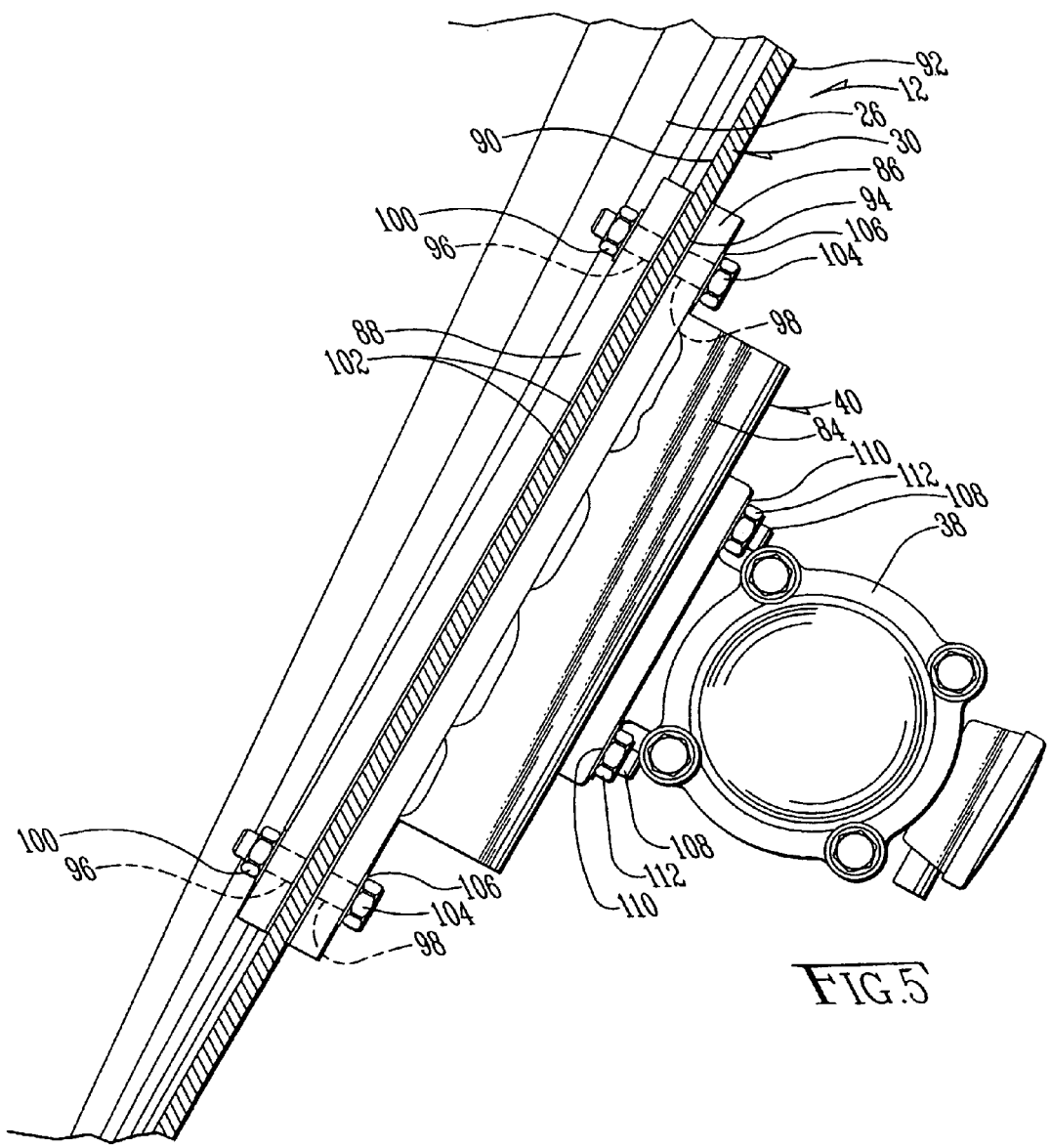
FIG. 5 illustrates a side perspective view in partial cross-section of a the mounting assembly being installed on the container system of FIG. 1.

As shown in FIG. 5, to assemble the mounting assembly (48) to the container (12), the interior plate (88) is provided on the interior (26) of the container (12) against the interior face (90) of one of the tapered floor panels (30). The exterior plate (86) is provided on the exterior (92) of the container (12) against the exterior face (94) the tapered floor panel (30). Four holes are drilled in the tapered floor panel (30), which align with four holes (96) in the interior plate (88) and four holes (98) in the exterior plate (86).

Welded to the interior plate (88), over the four holes (96), are four nylon lock nuts (100). Before the interior plate (88) is secured to the container (12), a urethane adhesive (102) is applied to both the interior plate (88) and exterior plate (86). The four holes (98) of the exterior plate (86) are then aligned over four holes (96) of the interior plate (88) and four bolts (104), provided with washers (106), are provided through the four holes (98) of the exterior plate (86), the four holes (96) of the interior plate (88) and secured to the four nylon lock nuts (100). (FIGS. 2 and 4). The bolts (104) are tightened and the adhesive (102) allowed to set. While the interior plate (88) and exterior plate (86) sandwich the tapered floor panel (30) therebetween.

Once the exterior plate (86) has been attached to the interior plate (88), the vibrator (38) is provided over four bolts (108) welded to the vibrator mount (62). Nord-Lock carbon steel anti-vibration washers (110), or similar anti-vibration washers, and stainless steel lock nuts (112), are provided over the four bolts (108) and tightened down. A nut locking material (114), such as Loctite® threadlocker manufactured by Henkel AG & Co., may be used to further secure the lock nuts (112) against inadvertent removal.

The vibrator (38) is connected to the control panel (42), which is secured to the support pole (14). The control panel (42) may instead be secured in any suitable location. If desired, a single motor control panel (not shown) may be programmed to operate one single vibrator (not shown) periodically or at periodic intervals during which the auger (68) is operating. The system (10) may also be provided with a proximity switch (116), such as those known in the art, to detect when the container (12) is empty. The proximity switch (116) may be coupled to the control assembly and override the signal from the auger (68) so that the control panel (42) does not actuate the vibrator (38) when the container (12) is empty. Alternatively, the control panel (42) may be coupled to a separate timer (118), to allow the vibrator (38) to turn on and off over a predetermined period of time.

When it is desired to use the system (10), material (120) is provided into the interior (26) of the container (12), through a removable lid (122). Once the current switch (60) senses current flow through the 120-volt feeder control voltage line (64), the control panel (42) actuates the vibrator (38) to prevent the material (120) from bridging or rat holing within the container (12). The control panel (42) continues to actuate the vibrator (38) until the current switch (60) no longer senses current flow through the 120-volt feeder control voltage line (64).

Figure 6:
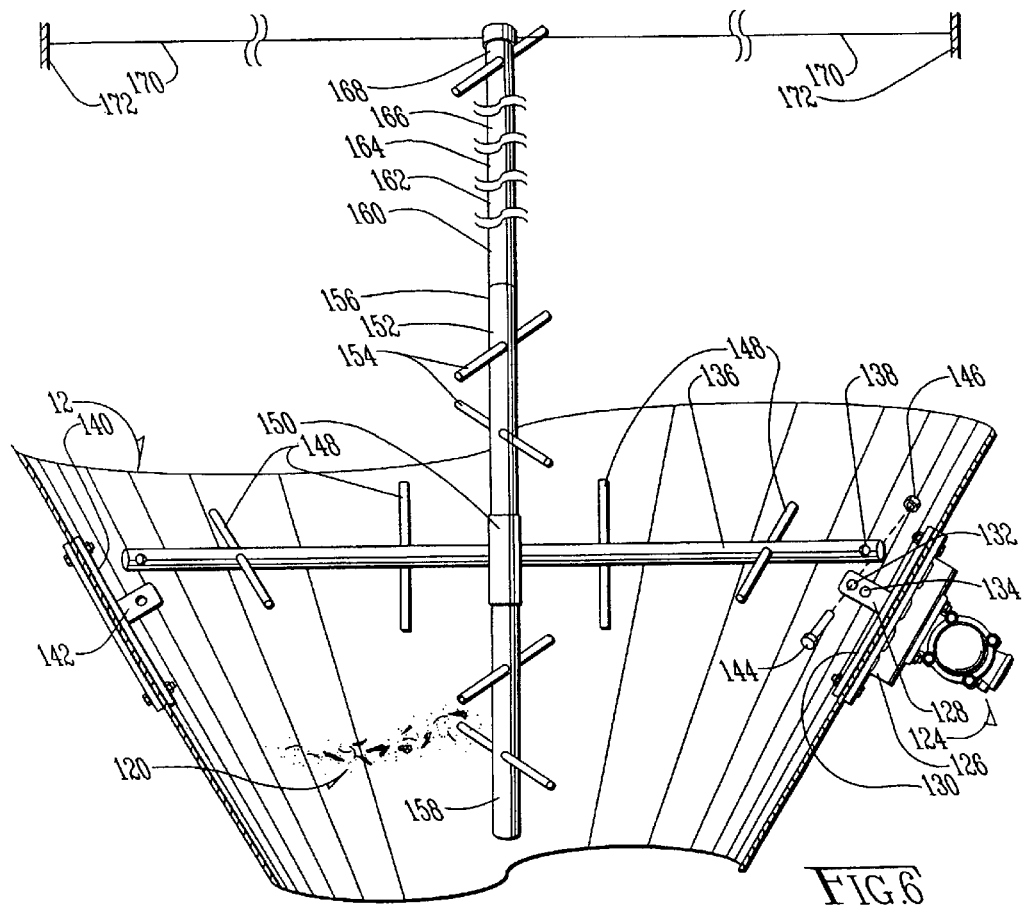
FIG. 6 illustrates a side perspective view in partial cross-section of an alternative embodiment of the container system of FIG. 1, having internal horizontal and vertical vibration bars.

An alternative embodiment of the present invention is shown generally as (124) in FIG. 6. In this embodiment of the invention, a mounting assembly (126) is provided with a steel pipe (128), welded to the interior plate (130) in a manner in which the pipe (128) extends substantially horizontally when the interior plate (130) is correctly positioned. Alternatively, the pipe (128) may be hinged to the interior plate (130). The pipe (128) is constructed of one half centimeter thick steel pipe, between ten and three hundred centimeters long, and between one and twenty centimeters in diameter, and preferably about one hundred eighty centimeters long and about six centimeters in diameter. The pipe (128) is provided with a one-centimeter diameter first hole (132) and a one-centimeter diameter second hole (132). Sized for mating engagement with the pipe (128), is a steel bar (136), provided with a hole (138) configured to align with the holes (132) and (134) in the pipe (128). Alternatively, the steel bar (136) may be a circular pipe.

A curved steel support plate (140) is secured to the opposite interior side of the container (12). The steel support plate (140) may be of any suitable configuration, but is preferably of a design similar to the interior plate (130), secured to the container (12), but not coupled to an exterior plate. The steel support plate (140) is also welded to a pipe (142) in an orientation and of a configuration similar to the pipe (128). The pipe (142) may be hinged to the steel support plate (140). The steel bar (136) is provided into mating engagement with the pipe (142) and the steel support plate (140) is moved into position within the container (12). As the steel support plate (140) is moved downward into position within the container (12), the steel bar (136) is moved into mating engagement with the pipe (128). The steel bar (136) is then secured to the pipe (128) by a bolt (144) passing through the holes (132), (134) and (138) and secured in place by a nylon lock nut (146).

The horizontal steel bar (136) is provided along its length with a plurality of steel fingers (148) approximately fifty centimeters long and three centimeters in diameter. The fingers (148) may be of any suitable number, location and configuration. Welded to the center of the steel bar (136) is a cylindrical steel bracket (150) sized to accommodate a vertical vibration bar (152). The vertical vibration bar (152) is 1.0 meter long, 3.5 centimeters in diameter, and may be constructed of PVC, aluminum or other suitable material. The vertical vibration bar (152) is provided along its length with a plurality of fingers (154) approximately 30 centimeters long and two centimeters in diameter. The fingers (154) may be constructed of PVC, aluminum or other suitable material. The vertical vibration bar (152) is bolted into the cylindrical steel bracket (150) and provided with one flanged end (156) and one tapered end (158). Additional vertical vibration bars (160), (162), (164), (166) and (168) may be bolted to the cylindrical steel bracket (150), the vertical vibration bar (152) or one another, depending upon the amount of material vibration desired.

As shown, the uppermost vertical vibration bar (168) may be secured to a line, such as a chain (170) or rope that, in turn, is coupled to the interior sides (172) of the container (12). The chain (170) supports the vertical vibration bars (152), (162), (164), (166) and (168) while allowing the vertical vibration bars (152), (162), (164), (166) and (168) to oscillate, thereby increasing the vibratory effect of the vertical vibration bars (152), (162), (164), (166) and (168). Vertical vibration bars (152), (160), (162), (164), (166) and (168) can be added or subtracted depending upon the type, size, consistency and condition of the material (120) within the container (12). Fine, damp material (120) may require more vertical vibration bars (152), (160), (162), (164), (166) and (168), while coarse, dry material (120) may not require any vertical vibration bars (152), (160), (162), (164), (166) and (168) at all.

Although the invention has been described with respect to a preferred embodiment thereof, it is to be understood that it is not to be so limited since changes and modifications can be made therein which are within the full, intended scope of this invention as defined by the appended claims.

What is claimed is:

1. A bin having a cylindrical sidewall having an upper end with a top cover and a lower end transitioning into an integral conical bottom wall with a lower discharge opening, and having a vibration system comprising: first and second of internal plates adapted to be mounted opposite one another to an interior surface of the conical bottom wall; each internal plates having a primary surface bordered by a perimeter edge, with the primary surface being shaped to mate with the interior surface of the conical bottom wall; an outer plate adapted to be bolted to an exterior surface of the conical bottom wall and to the first internal plate so as to sandwich the bottom wall therebetween; the outer plate having a primary surface bordered by a perimeter edge, with the primary surface of the outer plate shaped to mate with the exterior surface of the conical bottom wall; an adhesive layer between the conical bottom wall and the first internal plate; an adhesive layer between the conical bottom wall and the outer plate; a first bar extending between the first and second internal plates so as to span across the bin and vibrate particulate material in the bin; and a second bar extending upwardly from the first bar to further distribute the vibrations through the particulate material in the bin; a vibratory electric motor adapted to be connected to the outer plate to generate vibrations which are transmitted through the outer plate, the bottom wall, and the first internal plate, the cylindrical sidewall, and to the first bar, so as to preclude bridging of particular material within the bin.

2. The bin of claim 1 further comprising a plurality of fingers extending in different directions from the first bar.

3. The bin of claim 1 wherein a third bar extends downwardly from the first bar.

4. The bin of claim 3 wherein the third bar has a plurality of fingers extending in different directions.

5. The bin of claim 1 wherein the first internal plate is larger than the outer plate.

6. The bin of claim 1 further comprising an auger beneath the conical bottom wall to carry particulate material discharged from the discharge opening, and further comprising a sensor to sense operation of the auger and to actuate the vibrator in response to the auger operation.

7. A bin for particulate material, comprising: a cylindrical sidewall; an inverted conical bottom wall extending downwardly from the cylindrical sidewall; and a cover on top of the cylindrical sidewall; an internal plate and an external plate positioned on inner and outer surfaces of the inverted conical bottom wall so as to sandwich the inverted conical bottom wall between the plates; the plates and the inverted conical bottom wall having laterally extending and complimentary shaped curvatures; an inner adhesive layer between the internal plate and inner surface of the conical bottom wall; an outer adhesive layer between the external late and outer surface of the conical bottom wall; a first vibrator bar connected to the internal plate and extending into the bin; and a vibrator connected to the external plate to generate and transmit vibrations through the plates and the inverted conical bottom wall to the vibrator bar to preclude bridging of particulate material in the bin.

8. The bin of claim 7 further comprising a second internal plate secured to an inside surface of the inverted conical bottom wall in spaced relation to the first internal plate.

9. The bin of claim 8 wherein the first vibrator bar is connected to the second internal plate.

10. The bin of claim 7 further comprising a second vibrator bar connected to the first vibrator bar and extending upwardly within the cylindrical sidewall.

11. The bin of claim 7 further comprising fingers extending from the first vibrator bar.

* * * * *